US008848083B2

(12) United States Patent
Kim

(10) Patent No.: US 8,848,083 B2
(45) Date of Patent: Sep. 30, 2014

(54) PHOTOGRAPHING APPARATUS AND FILE TRANSFER METHOD USED IN THE PHOTOGRAPHING APPARATUS

(75) Inventor: Ji-hong Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 389 days.

(21) Appl. No.: 12/722,765

(22) Filed: Mar. 12, 2010

(65) Prior Publication Data
US 2010/0277635 A1 Nov. 4, 2010

(30) Foreign Application Priority Data

Apr. 29, 2009 (KR) ........................ 10-2009-0037819

(51) Int. Cl.
*H04N 5/222* (2006.01)
*H04N 1/00* (2006.01)
*H04N 5/232* (2006.01)

(52) U.S. Cl.
CPC ....... *H04N 5/23216* (2013.01); *H04N 1/00477* (2013.01); *H04N 1/00408* (2013.01); *H04N 2201/0013* (2013.01); *H04N 1/00236* (2013.01); *H04N 5/23293* (2013.01); *H04N 2201/0015* (2013.01); *H04N 1/00241* (2013.01); *H04N 2201/0084* (2013.01); *H04N 1/00442* (2013.01); *H04N 1/00413* (2013.01)
USPC .................................. 348/333.01; 348/207.1

(58) Field of Classification Search
USPC ............................ 348/207.99, 231.99–231.9, 348/207.1–207.11, 333.01–333.05
See application file for complete search history.

(56) References Cited

U.S. PATENT DOCUMENTS

| 5,861,918 | A  | * | 1/1999  | Anderson et al. .......... 348/231.9 |
| 6,774,935 | B1 | * | 8/2004  | Morimoto et al. ......... 348/211.5 |
| 7,143,114 | B2 | * | 11/2006 | Cazier .................... 1/1 |
| 7,671,903 | B2 | * | 3/2010  | Kawamura et al. ........ 348/231.2 |
| 7,853,115 | B2 |   | 12/2010 | Hatanaka |
| 8,370,403 | B2 | * | 2/2013  | Matsuki ........................ 707/821 |
| 8,438,172 | B2 | * | 5/2013  | Koga ............................ 707/749 |
| 2002/0093582 | A1 | * | 7/2002 | Aoki et al. ............... 348/333.02 |

(Continued)

FOREIGN PATENT DOCUMENTS

CN 1591423 A 3/2005

OTHER PUBLICATIONS

Office Action issued for CN 201010154570.8 (Nov. 8, 2013).
Office Action issued for CN 201010154570.8 (Jun. 19, 2014).

*Primary Examiner* — Aung S Moe
(74) *Attorney, Agent, or Firm* — Drinker Biddle & Reath LLP

(57) ABSTRACT

A photographing apparatus and a file transfer method in the photographing apparatus efficiently process files of an external device and image data of the photographing apparatus which have a same name when transferring the image data to the external device, such as a personal computer. The photographing apparatus which captures an image and creates and stores image data of the image includes a display unit that displays the image data, a communication interface that performs data communications with an external device by transmitting data to and receiving data from the external device, and a control unit that controls the communication interface to transfer the image data to the external device and, when the external device includes a file having the same file name as the image data, controls the display unit to display a synthesized image of the image data and an image of the file of the external device.

23 Claims, 10 Drawing Sheets

(56) References Cited

U.S. PATENT DOCUMENTS

| | | | |
|---|---|---|---|
| 2003/0011683 A1* | 1/2003 | Yamasaki et al. | 348/207.1 |
| 2004/0133550 A1* | 7/2004 | Okamura | 707/1 |
| 2004/0252198 A1* | 12/2004 | Hatanaka | 348/207.1 |
| 2005/0024513 A1* | 2/2005 | Hayashi et al. | 348/333.01 |
| 2006/0098105 A1* | 5/2006 | Okisu et al. | 348/231.99 |
| 2006/0256225 A1* | 11/2006 | Kawamura et al. | 348/333.02 |
| 2009/0079848 A1* | 3/2009 | Fujimura | 348/231.9 |

* cited by examiner

PHOTOGRAPHING APPARATUS AND FILE TRANSFER METHOD USED IN THE PHOTOGRAPHING APPARATUS

CROSS-REFERENCE TO RELATED PATENT APPLICATION

This application claims the priority benefit of Korean Patent Application No. 10-2009-0037819, filed on Apr. 29, 2009, in the Korean Intellectual Property Office, the disclosure of which is incorporated herein in its entirety by reference.

BACKGROUND

1. Field of the Invention

The present invention relates to a photographing apparatus and a file management method used in the photographing apparatus, and more particularly, to a photographing apparatus and a file transfer method used in the photographing apparatus in which, if an external device includes a file having the same file name as image data of the photographing apparatus, the image data of the photographing apparatus and the file of the external device that have the same file name are displayed when the image data is transferred to the external device, thereby improving convenience and efficiency in file transfer.

2. Description of the Related Art

Digital cameras create image files after shooting and store the image files in a memory by assigning each of the image files a file name. In general, digital cameras use a set of strings constituted of characters and numbers for file names. For example, a file name may be created by combining a set of character strings, such as "DSC" or "IMG" with ascending numbers. Thus, the image files may be assigned file names, such as DSC0001, DSC0002, . . . , DSC0100, and DSC0101, according to the sequence of capturing and stored in a memory of a digital camera.

Users may retrieve image files stored in a memory to view the image files through a liquid crystal display (LCD) screen of a digital camera or may delete image files that are no longer necessary or that are shot incorrectly. In addition, users may transfer image files to an external device, such as a personal computer, through a data communication cable in order to print out, keep, or further process the image files stored in the digital camera.

However, when image files are transferred from a digital camera to an external device, file names of the image files in the digital camera frequently overlap with those of files in the external device. For example, if a plurality of memory cards formatted on different days are used for shooting, the file names of the image files may overlap. Furthermore, if such image files with the same file names are transferred to a personal computer, a dialog box warning of overwriting appears on the personal computer, and thus the user has to check each of the image files so as to decide whether to overwrite. Instead of checking every image file so as to decide whether to overwrite, the user may create a new folder in the personal computer, move the image files from an original folder to the new folder, and then transfer image files from the digital camera to the original folder.

However, it is inconvenient for users to check whether to overwrite a number of image files. In addition, it is difficult for users to determine whether to overwrite image files having the same file names without being aware of the content of the image files, and precious image files may be lost. It is also inconvenient for users to create a new folder and move image files to the new folder.

Furthermore, a digital camera is insufficient by itself to confirm the content of an image file. An image viewer software in a personal computer has to be executed to open and confirm the image files one by one. Then, the user has to select whether to overwrite (e.g., by clicking on the "Yes" or "No" button in a dialog box). However, all these processes are very troublesome to the user.

SUMMARY

Embodiments of the present invention include a photographing apparatus and a file transfer method used in the photographing apparatus, in which files having the same names may be efficiently processed when image data of the photographing apparatus, such as a digital camera, are transferred to an external device, such as a personal computer.

Embodiments of the present invention provide improved convenience to a user where there are files with the same names when image data of a photographing apparatus, such as a digital camera, are transferred to an external device, such as a personal computer.

Embodiments of the present invention also provide convenience to a user in confirming the content of image files using a photographing apparatus where there are files with the same names during file transfer.

Embodiments of the present invention include a photographing apparatus and a file transfer method in the photographing apparatus in which, if an external device includes a file having the same file name as image data of the photographing apparatus, the image data of the photographing apparatus and the file of the external device that have the same file name are displayed when the image data is transferred to the external device, thereby improving convenience and efficiency in file transfer.

According to an aspect of the present invention, a photographing apparatus that captures an image and creates and stores image data of the image includes a display unit that displays the image data and a communication interface that performs data communications with an external device by transmitting data to and receiving data from the external device. The photographing apparatus also includes a control unit that controls the communication interface to transfer the image data to the external device and, when the external device includes a file having the same file name as the image data, controls the display unit to display a synthesized image of the image data and an image of the file of the external device.

The control unit may receive thumbnail information on the file of the external device that has the same file name as the image data, from the external device through the communication interface, and control the display unit to display a thumbnail image of the file.

The control unit may control the display unit to display a thumbnail image of the image data.

The control unit may confirm whether the external device includes a file having the same file name as the image data being transferred, by comparing the file name of the image data and the file name of the file of the external device, when a communication signal of the communication interface is received indicating that a delay has occurred in data transfer for a period of time.

The photographing apparatus may further include a user input unit that receives a user's input, wherein the control unit determines a method of transferring the image data to the external device based on an input signal from the user input unit.

The control unit may overwrite the file of the external device with the image data, may change the file name of the image data or the file of the external device, may transfer the image data to another folder of the external device, or may move the file of the external device to another folder when the image data is transferred to the external device.

According to another aspect of the present invention, a file transfer method of transferring image data of a photographing apparatus that captures an image and creates and stores image data of the image to an external device includes transferring the image data of the photographing apparatus to the external device, and when the external device includes a file having the same file name as the image data, displaying a synthesized image of the image data and an image of the file of the external device.

The file transfer method may further include checking a communication status in the transferring of the image data, and searching the external device for a file having the same file name as the image data when a delay has occurred in the transferring of the image data.

The displaying of the synthesized image may include receiving thumbnail information of the file of the external device that has the same file name as the image data and displaying a thumbnail image of the file.

The displaying of the synthesized image may further include displaying a thumbnail image of the image data.

The file transfer method may further include receiving a user's input, and transferring the image data with the same file name as a file of the external device to the external device according to the received user's input.

The transferring of the image data with the same file name as the file of the external device may include executing one of the following operations according to the user's input: overwriting the file of the external device with the image data, changing the file name of the image data or the file of the external device, or moving the image data to another folder of the external device or moving the file of the external device to another folder.

The file transfer method may further include setting an overlapping file transfer method before the transferring of the image data when the external device includes a file having the same file name as the image data, by selecting one of the following methods: overwriting the file of the external device with the image data, changing the file name of the image data or the file of the external device, or moving the image data to another folder of the external device or moving the file of the external device to another folder.

The file transfer method may further include selecting image data to be transferred from the photographing apparatus to the external device.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION

Embodiments of a photographing apparatus and a file transfer method in the photographing apparatus according to the present invention will be described in more detail in terms of structure and operation, with reference to the accompanying drawings.

Figure 1:
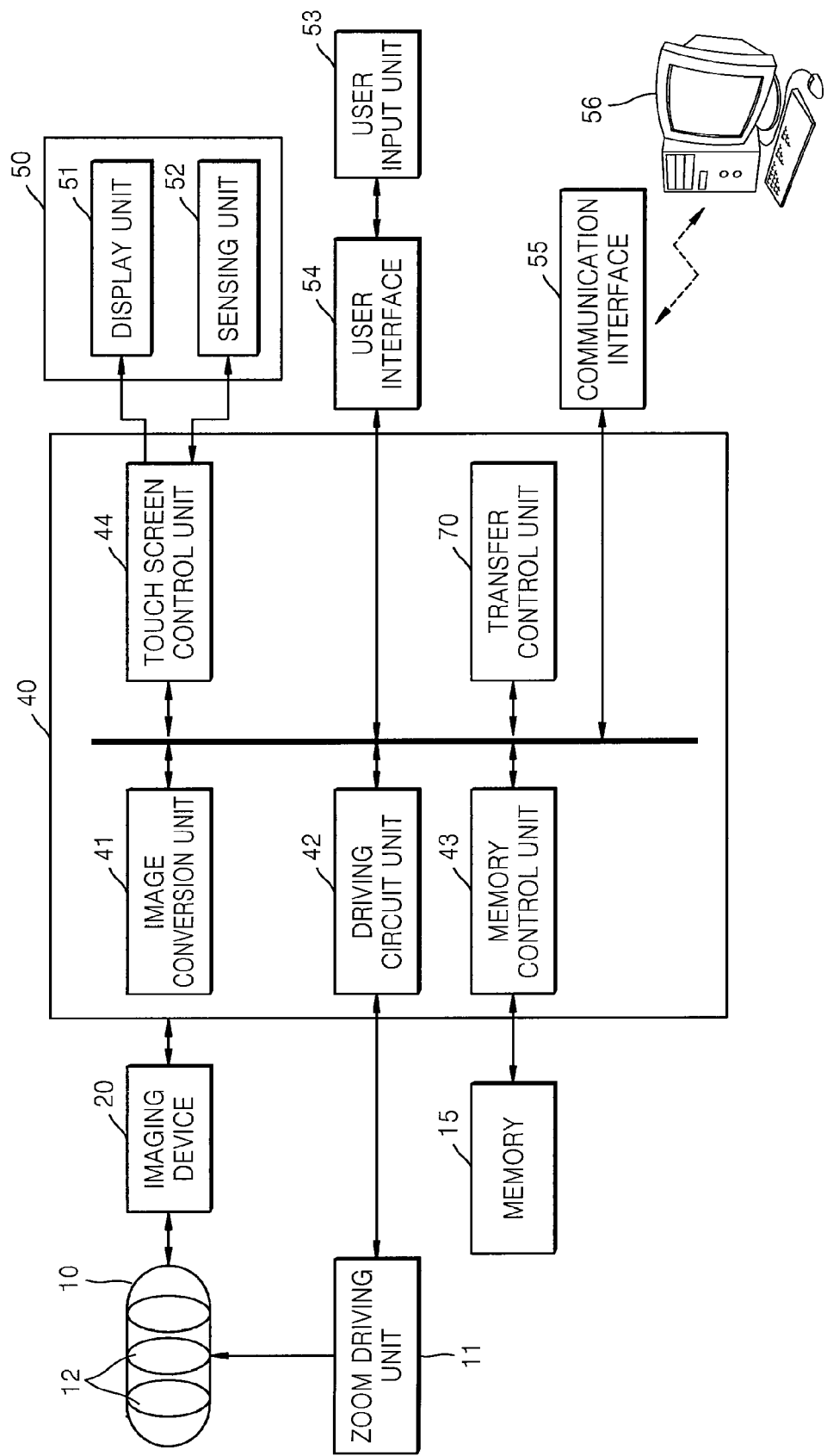
FIG. 1 is a block diagram of a photographing apparatus according to an embodiment of the present invention for explaining elements of the photographing apparatus.

FIG. 1 is a block diagram of a photographing apparatus according to an embodiment of the present invention for explaining elements of the photographing apparatus.

According to the present invention, a photographing apparatus refers to an apparatus having functions of capturing images of a subject and creating and storing image data of the images, such as a digital camera or a digital camcorder.

Referring to FIG. 1, in order to perform a function of transferring files to an external device 56, the photographing apparatus according to the current embodiment includes a transfer control unit 70 that controls a communication interface 55 that performs data communication with the external device 56. The photographing apparatus also includes a display unit 51 that displays an image of image data.

The transfer control unit 70 controls the communication interface 55 to transfer image data of the photographing apparatus to the external device 56. When the external device 56 includes a file having the same file name as image data being transferred, the transfer control unit 70 controls the display unit 51 to display an image of the image data being transferred and an image of the file of the external device 56 that have the same file name.

In order to perform the functions of capturing and storing images, the photographing apparatus may include an imaging device 20 that captures an image and converts the image into an electrical signal and an image conversion unit 41 that converts the electrical signal from the imaging device 20 into image data.

A zoom lens unit 10 that is disposed before the imaging device 20 includes a plurality of lenses 12 and forms external image light into an image on an image plane of the imaging device 20. The lenses 12 are disposed at variable intervals. If the intervals between the lenses 12 are varied, the magnification of the zoom lens unit 10 varies.

The lenses 12 are driven by a zoom driving unit 11 including a driving element such as a zoom motor, so that relative positions of the lenses 12 may be varied. The zoom driving unit 11 operates in response to a control signal from a driving circuit unit 42 of a control unit 40. Thus, the zoom driving unit 11 may drive the zoom lens unit 10 to vary the magnification of the zoom lens unit 10.

The imaging device 20 includes a photoelectric conversion device such as a charge-coupled device (CCD) or a complementary metal oxide semiconductor (CMOS) to convert image light incident through the zoom lens unit 10 into an electrical signal. The process of converting image light into an electrical signal may involve sub-processes: converting an image into an analog signal and converting the analog signal into a digital signal.

The control unit 40 is electrically connected to the imaging device 20, the zoom driving unit 11, a touch screen 50, a user interface 54, a memory 15, and the communication interface 55. The control unit 40 receives a control signal from or transmits a control signal to these elements to control the operations of the elements. In addition, the control unit 40 performs various functions, including data processing. The control unit 40 may include the image conversion unit 41, the driving circuit unit 42, a touch screen control unit 44, a memory control unit 43 that controls data storage in the memory 15, and the transfer control unit 70 that controls file transfer to the external device 56.

The control unit 40 may be implemented in various forms, such as a microchip or a circuit board including a microchip. The elements of the control unit 40 may be implemented by installing software or circuits in the control unit 40.

The memory control unit 43 controls recording of image data in the memory 15, reading the image data from the memory 15, reading or writing setting information, etc. The memory 15 may include a semiconductor memory device, for example, flash memory or synchronous dynamic random access memory (SDRAM), and may store the image data generated by the image conversion unit 41.

The photographing apparatus may further include a user input unit 53 that receives a user's manipulation. The user input unit 53 may be implemented by a menu manipulation button 103 or a function key 104 (refer to FIG. 3). The photographing apparatus may receive a signal from the user input unit 53 through the user interface 54. A user may select a menu displayed on the display unit 51 using the user input unit 53. Thus, the user may select a transfer method when transferring image data of the photographing apparatus to the external device 56 if the external device 56 includes a file having the same file name as the image data being transferred from the photographing apparatus.

The communication interface 55 is connected to the external device 56 for performing data communication by transmitting data to the external device 56 or by receiving data from the external device 56. The communication interface 55 may use a serial communication port, such as USB or IEEE 1394, a wireless communication method, etc.

Although the external device 56 in FIG. 1 may be a personal computer, the present invention is not limited thereto and the external device 56 may be any apparatus that uses a file and folder system for storing data files and has a data communication function. In addition, the present invention is not limited by an operating system (OS) of the external device 56.

The touch screen 50 is an alternative input device to a keyboard or a mouse. Since the touch screen 50 allows a user to perform an operation by touching a surface of the display unit 51 directly with a hand or with a pen, the user may work intuitively through a graphical user interface (GUI) environment.

The touch screen 50 may include the display unit 51, which displays an image of image data, and a sensing unit 52 that senses a touch on the surface of the display unit 51. The display unit 51 may be a liquid crystal display (LCD) or an organic light-emitting display (OLED). The display of an image on the display unit 51 may be controlled by the touch screen control unit 44.

The sensing unit 52 is installed on the surface of the display unit 51 to sense a touch on the surface of the display unit 51. The sensing unit 52 may be implemented based on various technologies, for example, using a resistive sensing element, a capacitive sensing element, a surface acoustic wave (SAW) sensing element, an infrared (IR) sensing element, or an optical sensing element. A signal input through the sensing unit 52 may be transmitted to the control unit 40 through the touch screen control unit 44.

Figure 2:
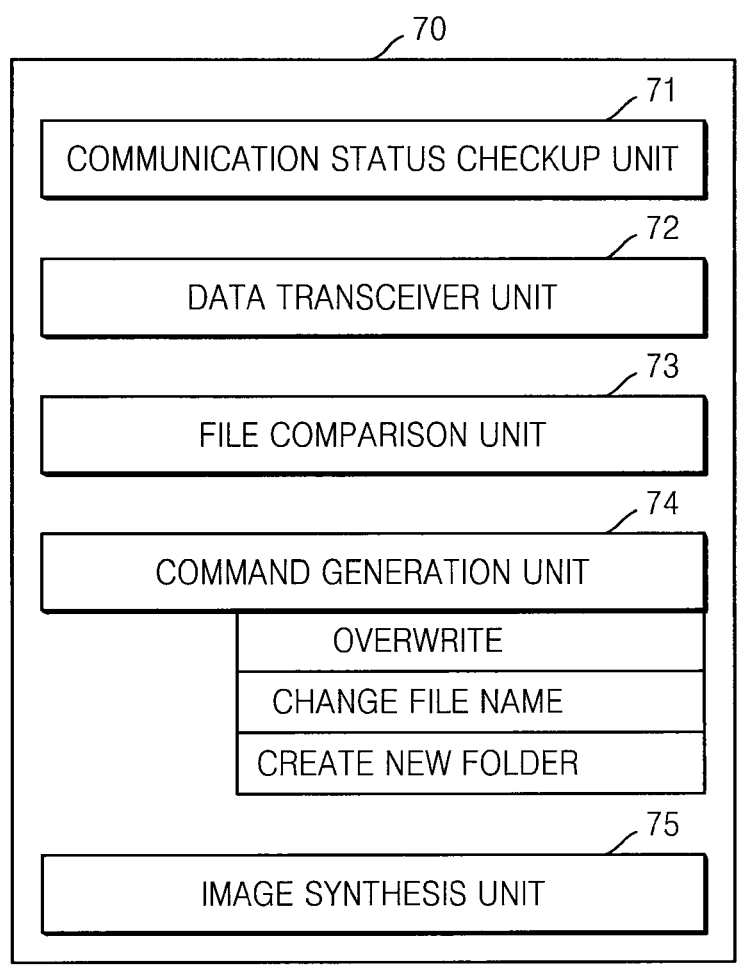
FIG. 2 is a block diagram of a transfer control unit of the photographing apparatus of FIG. 1, according to an embodiment of the present invention.

FIG. 2 is a block diagram of the transfer control unit 70 of the photographing apparatus of FIG. 1.

The transfer control unit 70 includes a communication status checkup unit 71, a data transceiver unit 72, a file comparison unit 73, a file/folder management command generation unit 74, and an image synthesis unit 75 that generates an image to be displayed on the display unit 51.

The data transceiver unit 72 transmits image data or a command of the photographing apparatus to the external device 56 or receives data such as a file or folder information of the external device 56 by controlling the communication interface 55. If a user selects image data to be transferred from a list of image data of the photographing apparatus displayed on the display unit 51, the data transceiver unit 72 transmits the selected image data to the external device 56.

The communication status checkup unit 71 checks a data communication status of the communication interface 55 in connection with the external device 56. The communication status checkup unit 71 may detect whether a delay in data transmission has occurred for a specific period of time, from a communication signal of the communication interface 55. Thus, the communication status checkup unit 71 may detect an interruption in file transfer to the external device 56 that may be due to the external device 56 including a file having the same name as image data being transferred.

If the communication status checkup unit 71 generates a signal notifying a delay in data transfer, the data transceiver unit 72 receives the file having the same file name as the image data being transferred of the photographing apparatus from the external device 56. The file comparison unit 73 may compare the image data of the photographing apparatus and the file of the external device 53 in terms of file name, file size, content, etc.

The command generation unit 74 may generate a command for a transfer method when a delay occurs in transferring the image data of the photographing apparatus to the external device 56 and the external device 56 includes a file having the same file name as the image data of the photographing apparatus being transferred.

Figure 3:
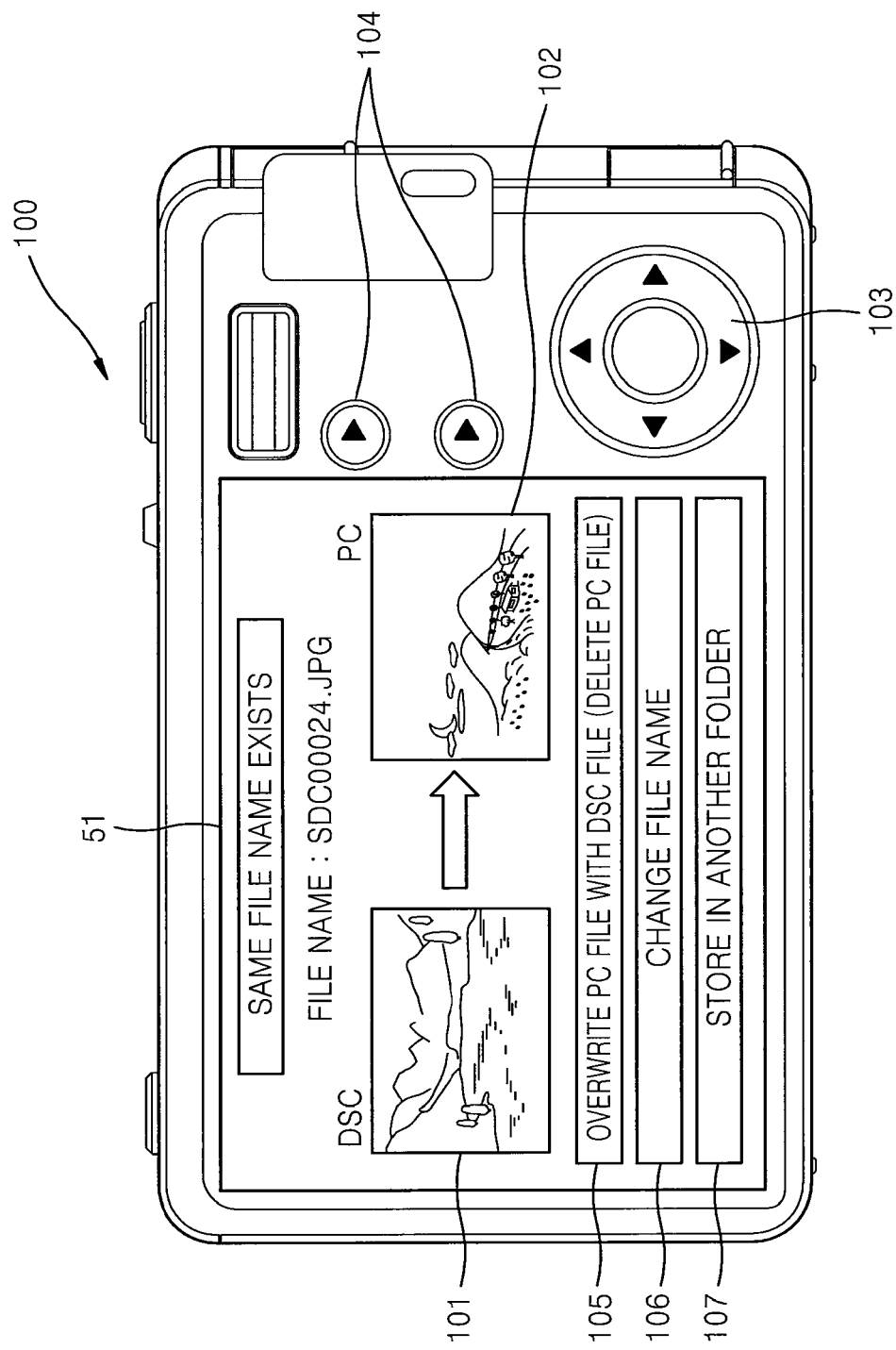
FIG. 3 is a view illustrating exemplary operations of the photographing apparatus of FIG. 1.

Examples of the command may include "Overwrite" (105), "Change File Name" (106), and "Store in Another Folder" (107), as illustrated in FIG. 3. A menu for executing such commands may be displayed on the display unit 51. If the user selects one of the displayed commands, the corresponding command generated by the command generation unit 74 is transmitted to the external device 56 through the data transceiver unit 72 in order to overwrite the file of the external device 56 having the same file name as the image data being transferred, to change the file name of the image data being transferred or the file name of the file of the external device 56, or store the file of the external device 56 in another folder of the external device 56.

When the external device 56 includes the file having the same file name as the image data being transferred, the image synthesis unit 75 generates a synthetic image of an image of the image data and an image of the file of the external device 56 that have the same filename to be displayed on the display unit 51, and transmits the synthetic image to the touch screen control unit 44.

FIG. 3 is a view illustrating exemplary operations of the photographing apparatus of FIG. 1.

According to the structure of the transfer control unit 70 described above, when the external device 56 includes a file having the same file name ("SDC00024.JPG" in FIG. 3) as the image data being transferred from the photographing apparatus, an image 101 of the image data being transferred and an image 102 of the file of the external device 56 are displayed on the display unit 51 of the photographing apparatus 100. Thus, the user may compare and confirm the contents of the image data and the file having the same file name.

The image synthesis unit 75 may use the entire image data being transferred and the entire file of the external device 56 when generating a synthetic image. However, in order to reduce the time for data processing required for image synthesis, the image synthesis unit 75 may generate a synthetic image from a thumbnail image of the image data and a thumbnail image of the file of the external device 56.

Figure 4:
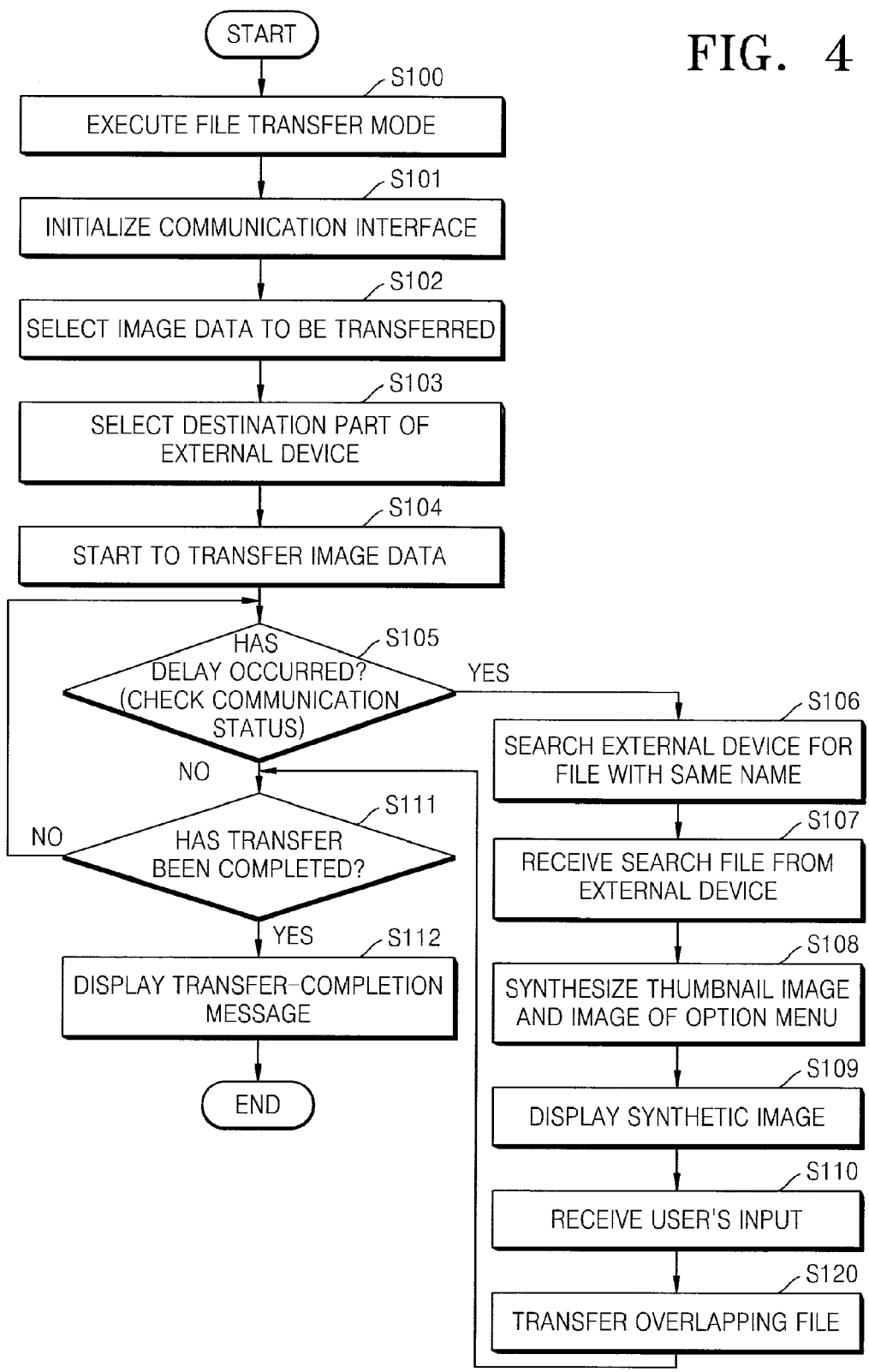
FIG. 4 is a flowchart of a file transfer method in the photographing apparatus, according to an embodiment of the present invention.

FIG. 4 is a flowchart of a file transfer method in the photographing apparatus, according to an embodiment of the present invention.

The file transfer method of FIG. 4 according to the current embodiment is a method of transferring image data from a photographing apparatus to an external device, the photographing apparatus having functions of capturing images of a subject and creating and storing image data of the images, such as a digital camera or a digital camcorder. The file transfer method includes transferring image data from the photographing apparatus to the external device (operation S104) and displaying, if the external device includes a file having the same file name as the image data, an image of the image data and an image of the file that have the same file name (operation S109).

According to the file transfer method, a user may confirm the contents of the image data and a file of the external device that have the same file name, without having to execute an application program in the external device, such as a personal computer.

The file transfer method may further include checking a communication status (operation S105), e.g., whether a delay has occurred in transferring the image data from the photographing device to the external device (operation S104) that may be due to the external device including a file having the same file name as the image data.

The file transfer method may further include searching the external device for a file having the same file name as the image data being transferred if a delay has occurred in transferring the image data, in order to confirm whether the delay has occurred due to the external device including a file having the same file name as the image data (operation S106).

The file transfer method may further include receiving a user's input after images of the image data and the file of the external device that have the same file name are displayed (operation S110) and transferring the image data having the same file name as a file of the external device to the external device according to a transfer method for an overlapping file determined based on the received user's input (operation S120). Thus, the user may select one of various file transfer methods through operations S110 and S120 when the external device includes a file having the same file name as the image data being transferred. This improves the convenience of use.

Each operation in the file transfer method of FIG. 4 will be described. When a file transfer mode is executed in the photographing apparatus (operation S100), a communication interface is initialized (operation S101). Then, a list of image data stored in the photographing apparatus is displayed on the display unit, so that the user may select image data to be transferred (operation S102). Operation S102 of selecting image data to be transferred is optional, but may provide convenience to the user. Operation S102 of selecting image data to be transferred may be executed before operation S101 of initializing the communication interface.

Once the image data to be transferred has been selected (operation S102), a destination part of the external device, for example, a hard disk drive (HDD) and a new folder name, are selected (operation S103). Operation S103 of selecting a destination part of the external device may involve displaying available destination parts of the external device to allow the user to select one of available destination parts.

Figure 6:
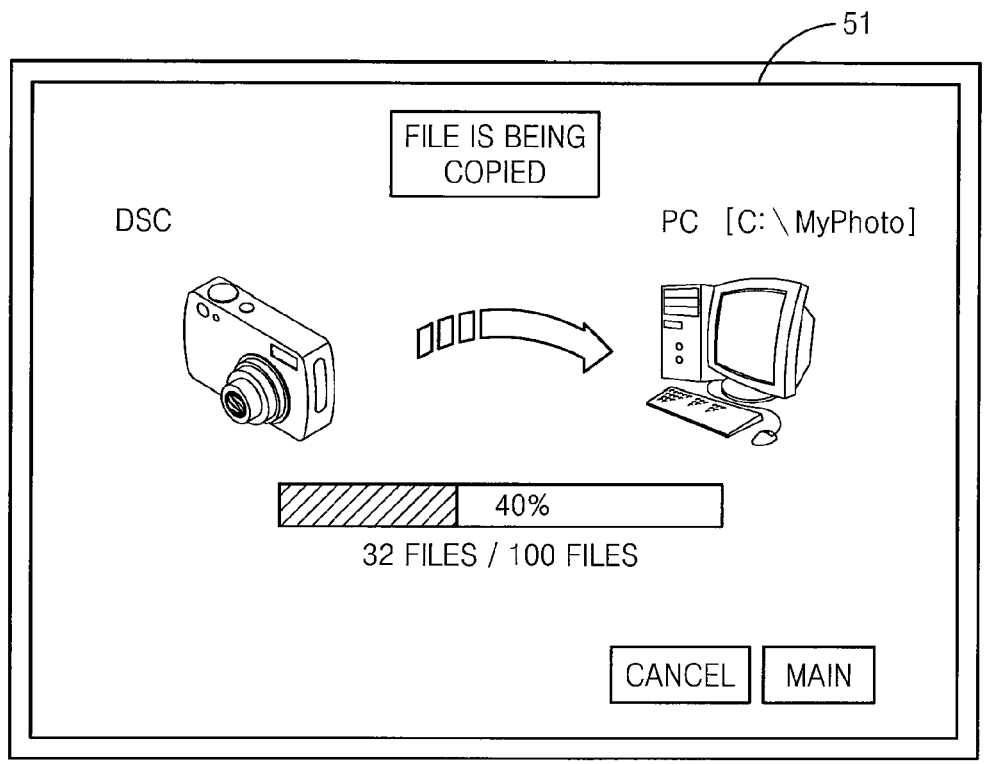
FIG. 6 illustrates an example of an execution screen for a transfer operation of the file transfer method of FIG. 4.

FIG. 6 illustrates an example of an execution screen in the transfer operation (S104) of the file transfer method of FIG. 4.

Once a destination part of the external device has been selected (operation S103), the image data starts to be transferred (operation S104). As illustrated in FIG. 6, while the image data is transferred to the external device, information on a data-transfer-progress status may be displayed on the display unit 51.

While the image data of the photographing device is transferred to the external device (operation S104), the operation S105 of checking whether a delay has occurred in transferring the image data may be executed. When the data transfer has been completed (operation S111), a transfer-completion message is displayed (operation S112), and the file transfer mode is terminated.

However, if a delay occurs for a period of time while the image data is transferred, the external device is searched for a file having the same file name as the image data being transferred (operation S106).

Although not illustrated in FIG. 4, if the file search operation (operation S106) is performed due to a delay in transferring the image data, but a file having the same file name as the image data is not found in the external device, it is checked whether a communication status error (for example, whether the communication is terminated), has occurred. Then, the communication status error is displayed on the display unit.

If a file having the same file name as the image data is found in the external device (operation S106), the photographing apparatus receives the found file from the external device (operation S107). In operation S107, the photographing apparatus may receive the entire found file from the external device. However, the photographing apparatus may receive just thumbnail information in a first half part of the found file so as to reduce data processing time.

After operation S107 of receiving the search file, a thumbnail image of the file received from the external device, a thumbnail image of the image data being transferred, and an image of information on menus to be executed are synthesized to create a synthetic image (operation S108), and the synthetic image is displayed (operation S109). After operation S109 of displaying the synthetic image, a user's input is received (operation S110). The user may check the contents of the image data and the file of the external device that have the same file name from the displayed synthetic image and select a menu on the displayed synthetic image for processing the overlapping file. Herein, the "overlapping file" refers to the image data having the same file name as a file of the external device.

In operation S120, the overlapping file is transferred based on a user's selection in operation S110. If the transfer of the overlapping file is completed, a next image data of the photographing apparatus starts to be transferred.

Figure 5:
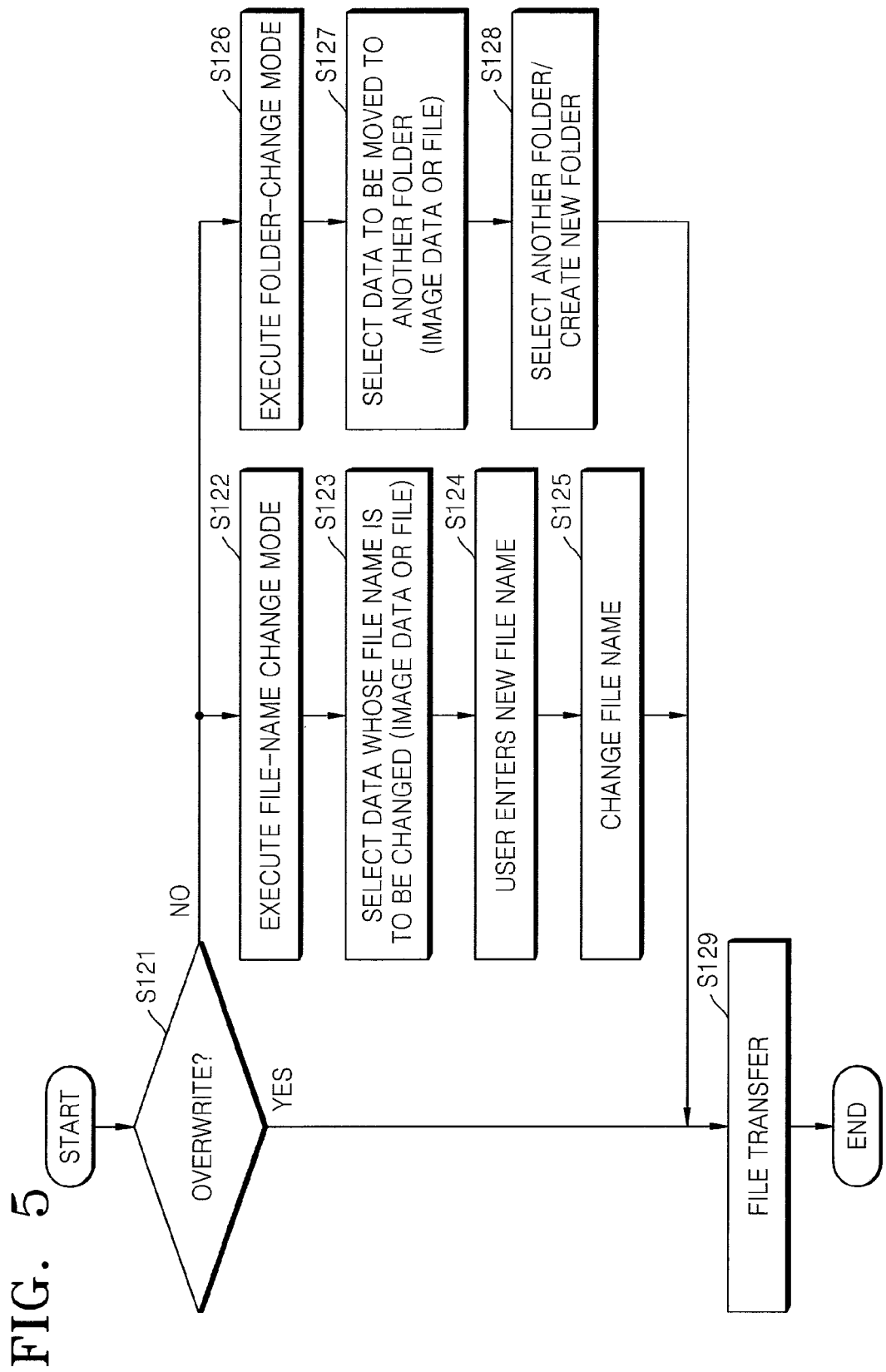
FIG. 5 is a flowchart for explaining operation of transferring image data with the same file name as a file of an external device in the file transfer method of FIG. 4, according to an embodiment of the present invention.

FIG. 5 is a flowchart for explaining sub-operations of operation S120 of transferring image data with the same file name as a file of an external device in the file transfer method of FIG. 4.

Operation S120 of transferring the overlapping file in FIG. 5 involves one of the following operations based on a user's selection in operation S110: overwriting the file of the external device with the image data (operation S121), changing the file name of the image data or the file name of the file of the external device (operations S122 through S125), or transferring the image data to another folder in the external device or moving the file of the external device to another folder (operation S126 through S128).

When a first menu 105 is selected on the screen of the display unit 51 of FIG. 3, the overwrite operation S121 may be executed. When a second menu 106 is selected, the file name-change operations S122 through S125 may be executed. When a third menu 107 is selected, the folder-change operations S126 through S128 may be executed.

Figure 7:
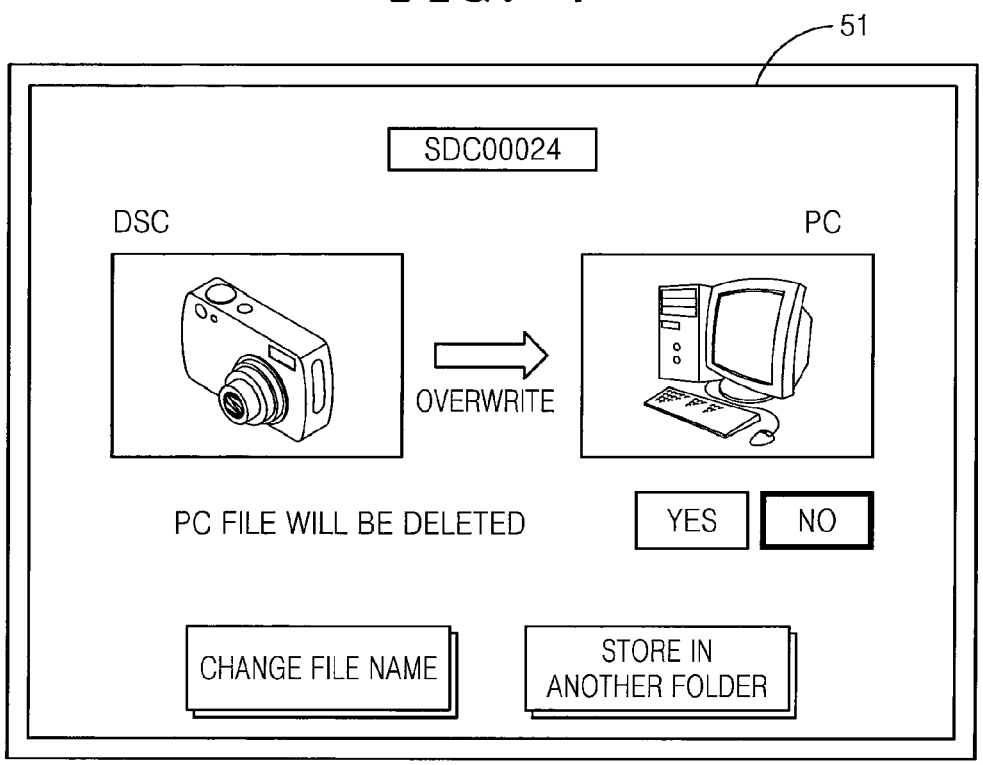
FIG. 7 illustrates an example of an execution screen for an overwrite operation in the file transfer method of FIG. 4.

FIG. 7 illustrates an example of an execution screen for the overwrite operation S121 in the file transfer method of FIG. 4.

When the first menu 105 of FIG. 3 is selected, an overwrite mode is executed (operation S121), displaying menus and information, as illustrated in FIG. 7, on the display unit 51.

If the user selects a "Yes" button for a menu item "PC file will be deleted" in FIG. 7, the image data of the photographing device is transferred to the external device, overwriting the file of the external device having the same name as the image data of the photographing device (operation S129). Alternatively, the user may select "Change File Name" button or "Store in Another Folder" button in FIG. 7 to execute the file name-change operations S122 through S125 or the folder-change operations S126 through S128, respectively.

Figure 8:
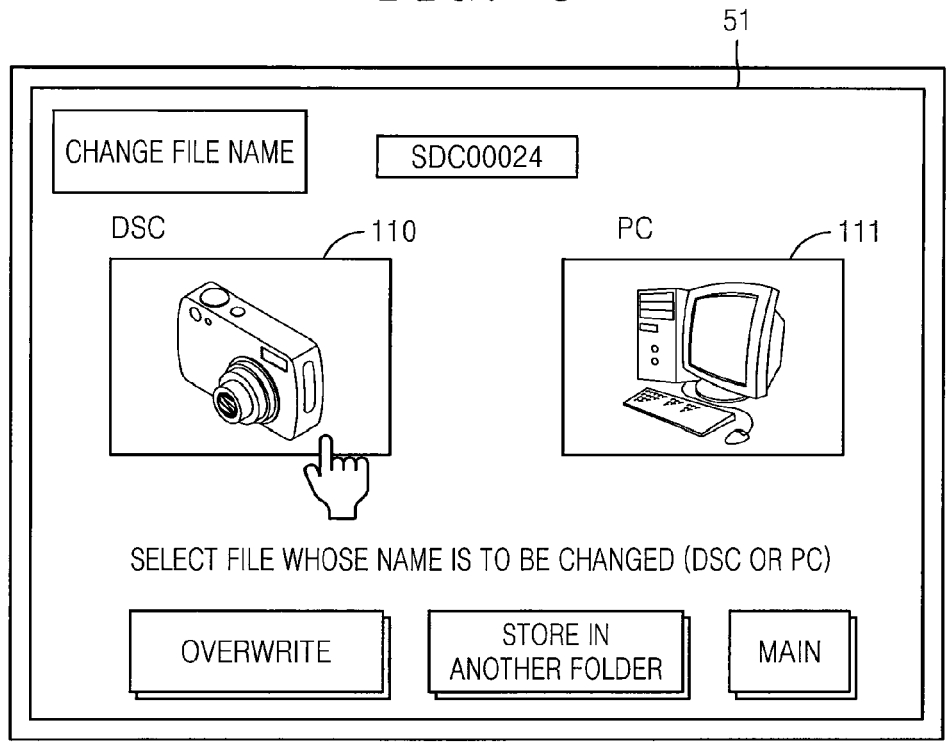
FIG. 8 illustrates an example of an execution screen for a file name-change operation in the file transfer method of FIG. 4.

FIG. 8 illustrates an example of an execution screen for the file name-change operation in the file transfer method of FIG. 4.

When the second menu 106 of FIG. 3 is selected, a file name-change mode is executed (S122), displaying menus and information, as illustrated in FIG. 8, on the display unit 51. The user may select a digital still camera (DSC) button 110 or a personal computer (PC) button 111 to change the file name of target data corresponding to the selection (operation S123 of FIG. 5). If the DSC button 110 is selected, operations of changing the file name of the image data of the photographing apparatus may be executed. If the PC button 111 is selected, operations of changing the file name of the file of the external device may be executed.

Figure 9:
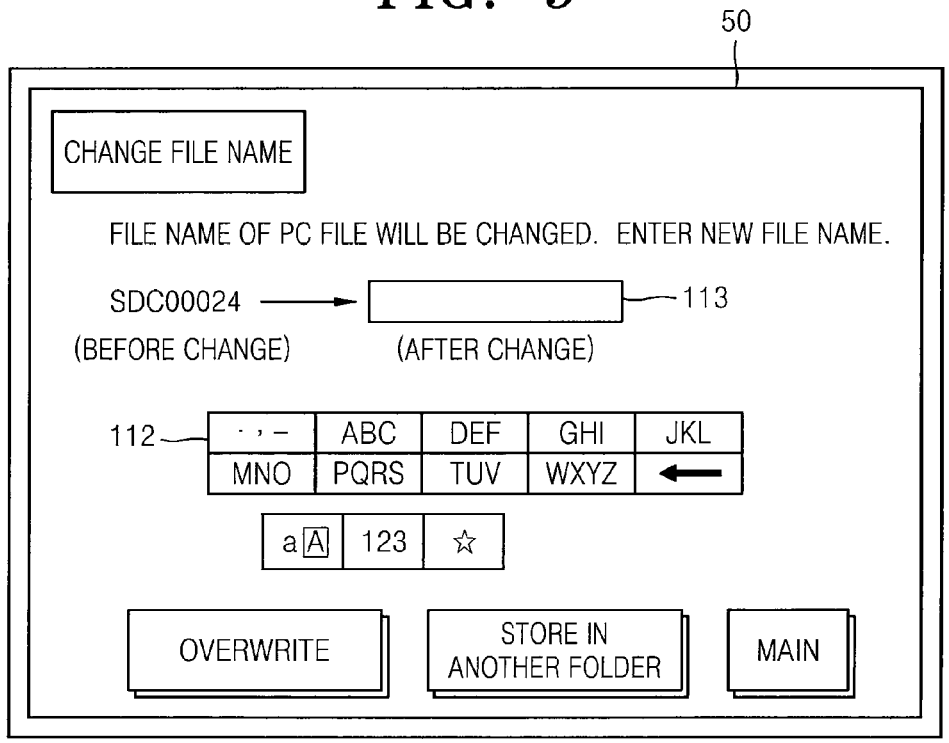
FIG. 9 illustrates an example of an execution screen for the file name-change operation in the file transfer method of FIG. 8.

FIG. 9 illustrates an example of an execution screen for the file name-change operation S124 in the file transfer method of FIG. 8. In particular, FIG. 9 illustrates entering a new file name when the PC button 111 is selected in FIG. 8.

The touch screen 50 of the photographing apparatus displays an input box 113, which guides the user to enter a new file name for the file of the external device having the file name of "SDC00024", and other information. The user may enter a new file name into the input box 113 by directly touching a keypad 112 on the touch screen 50 (operation S124). The photographing apparatus may display a suggested new file name, such as "SDC00024-1", in the input box 113 for convenience of the user.

When a new file name has been input by the user (operation S124), the file name of the file is changed to the new file name (operation S125), and then the image data of the photographing apparatus is transferred to the external device (operation S129).

Figure 10:
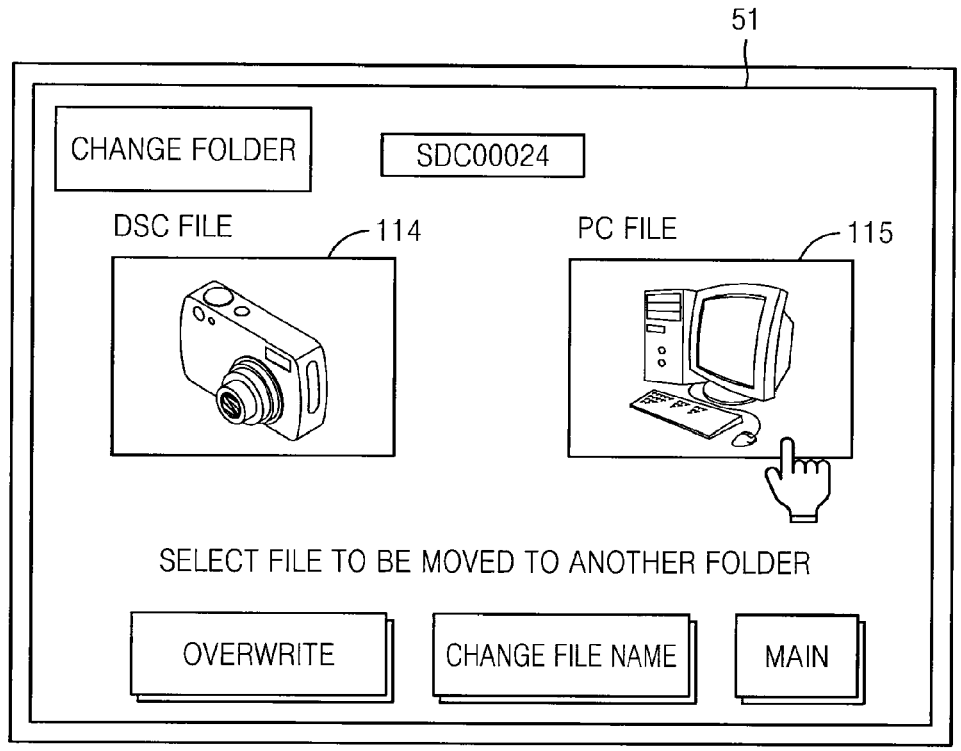
FIG. 10 illustrates an example of an execution screen for a folder-change operation in the file transfer method of FIG. 4.

FIG. 10 illustrates an example of an execution screen for the folder-change operation in the file transfer method of FIG. 4.

When the third menu 107 of FIG. 3 is selected, a folder-change mode is executed (S126), displaying menus and information, as illustrated in FIG. 10, on the display unit 51. The user may select a DSC button 114 or a PC button 115 to select whether the image data or the file of the external device having the same name is transferred to another folder (operation S127 of FIG. 5). If the DSC button 114 is selected, the image data of the photographing apparatus may be transferred to another folder. If the PC button 115 is selected, the file of the external device may be moved to another folder.

Figure 11:
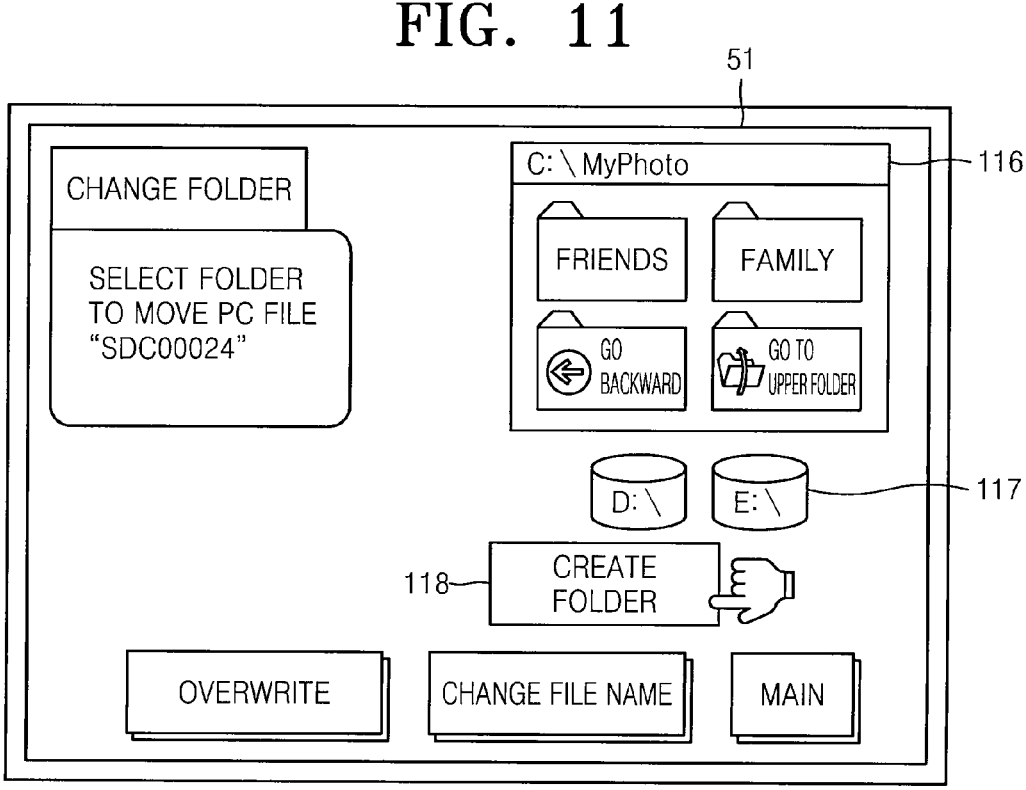
FIG. 11 illustrates an example of an execution screen for selecting another folder or creating a new folder in the folder-change operation of the file transfer method of FIG. 10.

FIG. 11 illustrates an example of an execution screen for selecting another folder or creating a new folder in the folder-change operation of the file transfer method of FIG. 10. In particular, FIG. 11 illustrates the execution screen when the PC button 115 is selected in FIG. 10 to move the file (SDC0024) of the external device to another folder.

The display unit 51 of FIG. 11 displays a folder selection menu 116 for guiding the user to select a folder, a disk selection menu 117 displaying hard drives for the user to select, and a folder creation menu 118 for guiding the user to create a new folder. The user may select a folder to which the file of the external device is to be moved or may create a new folder by selecting one of the menus (operation S128 of FIG. 5).

Figure 12:
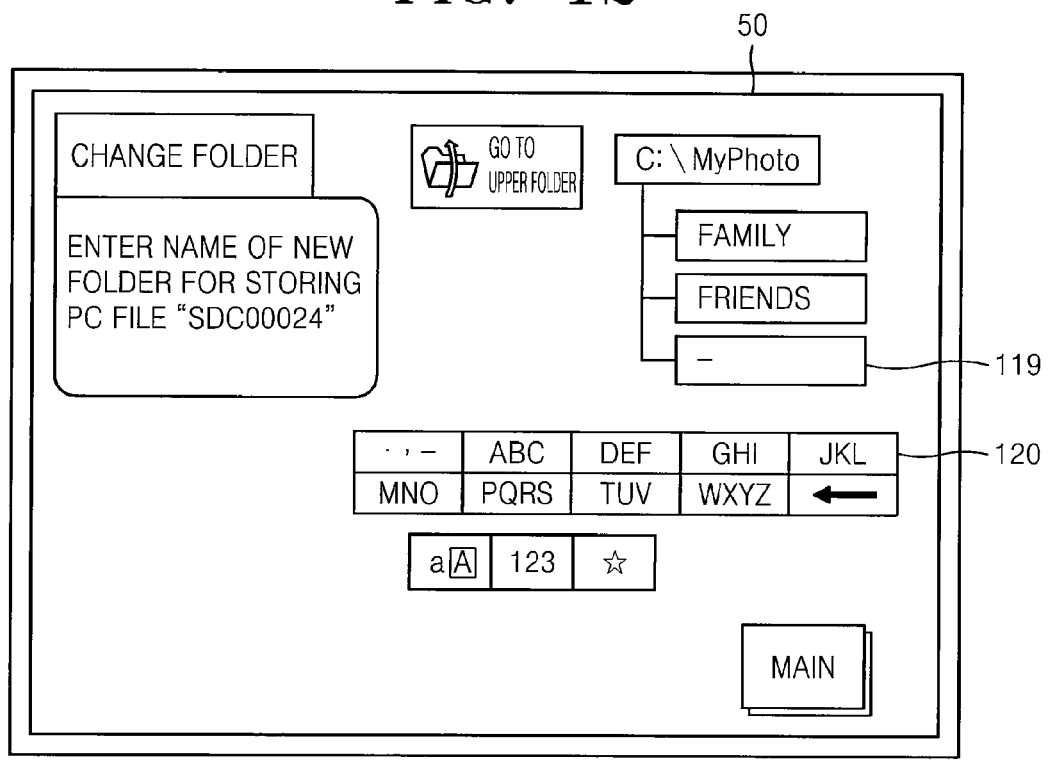
FIG. 12 illustrates an example of an execution screen for entering a name of a new folder in the folder-change operation of the file transfer method of FIG. 10.

FIG. 12 illustrates an example of an execution screen for entering a name of a new folder in the folder-change operation of the file transfer method of FIG. 10. The new folder is created when the folder creation menu 118 is selected in FIG. 11.

The touch screen 50 of the photographing apparatus displays an input box 119 that guides the user to enter a name of a new folder for the file of the external device with the file name of "SDC00024", and other information. The user may enter a name of the new folder into the input box 119 by directly touching a keypad 120 on the touch screen 50. The photographing apparatus may display a suggested name for the new folder, such as "DuplicateFiles", in the input box 119 for convenience of the user.

According to the file transfer method of the photographing apparatus described above, the user may confirm the contents of the image data and the file of the external device that have the same file name conveniently, without having to execute an application program in the external device, such as a personal computer, for confirming the contents of the overlapping data, since the display unit of the photographing apparatus displays images of the image data and the file of the external device that have the same file name.

The user may select one of various file transfer methods through operations S110 and S120 when the external device includes a file having the same file name as the image data being transferred, which improves the convenience of use.

Figure 13:
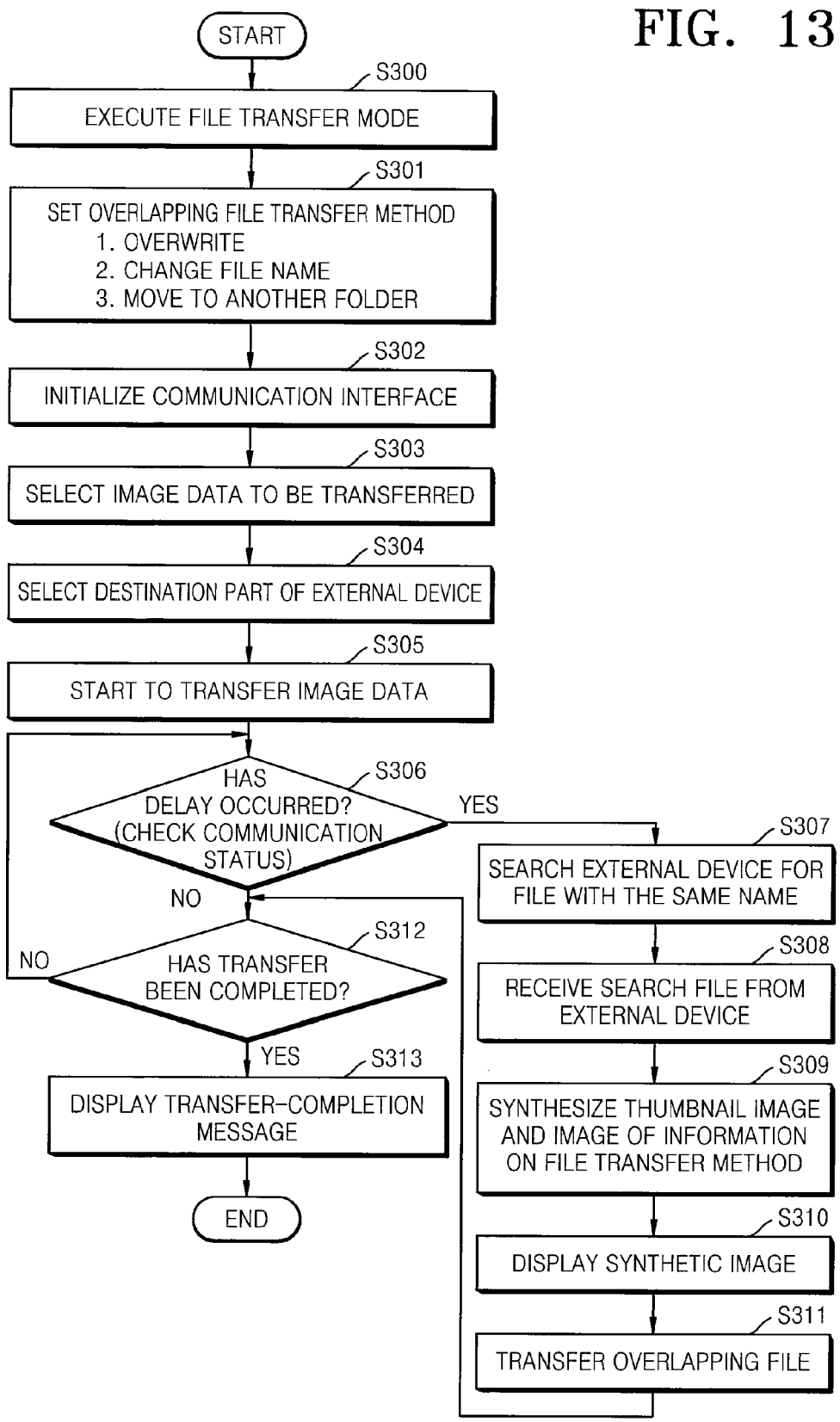
FIG. 13 is a flowchart of a file transfer method in the photographing apparatus, according to another embodiment of the present invention.

FIG. 13 is a flowchart of a file transfer method in the photographing apparatus, according to another embodiment of the present invention.

The file transfer method of FIG. 13 according to the current embodiment relates to a method of transferring image data from a photographing apparatus to an external device, the photographing apparatus having functions of capturing images of a subject and creating and storing image data of the images, such as a digital camera or a digital camcorder.

The file transfer method of FIG. 13 according to the current embodiment is similar to the file transfer method illustrated in FIGS. 4 and 5, except that an operation S301 of setting an overlapping file transfer method is further executed before transfer operation S305. The file transfer method in the photographing apparatus may further include setting an overlapping file transfer method (operation S301), transferring the image data to the external device (operation S305), and displaying, if the external device includes a file having the same file name as the image data of the photographing apparatus, images of the image data and the file of the external device that have the same file name (operation S310).

According to the file transfer method, a user may confirm the contents of the image data and a file of the external device that have the same file name, without having to execute an application program in the external device, such as a personal computer.

The file transfer method may further include checking a communication status (operation S306), e.g., whether a delay has occurred in transferring the image data from the photographing device to the external device (operation S305) due to the external device including a file having the same file name as the image data.

The file transfer method may further include searching the external device for a file having the same file name as the image data being transferred if a delay has occurred in transferring the image data, in order to confirm whether the delay has occurred due to the external device including a file having the same file name as the image data (operation S307).

The file transfer method may further include transferring the overlapping file, i.e., the image data having the same file name as a file of the external device, to the external device (operation S311) after displaying the images of the image data and the file of the external device that have the same file name (operation S310). In addition, the image data having the same file name as a file of the external device may be automatically transferred based on the transfer method predetermined in operation S301 of setting an overlapping file transfer method.

Each operation in the file transfer method of FIG. 13 will be described. When a file transfer mode is executed in the photographing apparatus (operation S300), an overlapping file transfer method is set (operation S301).

Operation S301 of setting an overlapping file transfer method may involve selecting one of the following operations as the overlapping file transfer method if the external device includes a file having the same file name as the image data: overwriting the file of the external device with the image data (option 1 in operation S301), changing the file name of the image data or the file of the external device (option 2 in operation S301), or transferring the image data to another folder or moving the file of the external device to another folder (option 3 in operation S301).

After the operation S301 of setting an overlapping file transfer method, a communication interface is initialized (operation S302). Then, a list of image data stored in the photographing apparatus is displayed on the display unit, so that the user may select image data to be transferred (operation S303). Operation S303 of selecting image data to be transferred is optional, but may provide convenience to the user. Operation S303 of selecting image data to be transferred may be executed before operation S302 of initializing the communication interface.

Once the image data to be transferred has been selected (operation S303), a destination part of the external device, for example, a hard disk drive (HDD) and a new folder name, are selected (operation S304). Operation S304 of selecting a destination part of the external device may involve displaying available destination parts of the external device to allow the user to select one of the available destination parts.

Once a destination part of the external device has been selected (operation S304), the image data starts to transfer (operation S305).

While the image data of the photographing device is transferred to the external device (operation S305), operation S306 of checking whether a delay has occurred in transferring the image data may be executed. When the data transfer has been completed (operation S312), a transfer-completion message is displayed (operation S313), and the file transfer mode is terminated.

However, if a delay occurs for a period of time while the image data is transferred, the external device is searched for a file having the same file name as the image data being transferred (operation S307).

Although not illustrated in FIG. 13, if the file search operation (operation S107) is performed due to a delay in transferring the image data, but a file having the same file name as the image data is not found in the external device, it is checked whether a communication status error (for example, whether the communication is terminated), has occurred. Then, the communication status error is displayed on the display unit and the file transfer is terminated.

If a file having the same file name as the image data is found in the external device (operation S307), the photographing apparatus receives the found file from the external device (operation S308). In operation S308, the photographing apparatus may receive the entire search file from the external device. However, the photographing apparatus may receive just thumbnail information in a first half part of the found file so as to reduce data processing time.

After operation S308 of receiving the search file, a thumbnail image of the file received from the external device, a thumbnail image of the image data being transferred, and an image of information on the file transfer method or a transfer status are synthesized to create a synthetic image (operation S309), and the synthetic image is displayed (operation S310).

The user may confirm the contents of the image data and the file of the external device that have the same file name from the displayed synthetic image and check the overlapping file transfer method, i.e., whether to overwrite the file with the same name as the image data, whether to change the file name of the image data, or whether to move the overlapping file to another folder.

In the display operation 310, a menu for final confirmation on the file transfer method selected (from among overwriting, changing a file name, and changing a folder) by the user, i.e., a menu, for example, a YES or NO button, for confirming whether to apply the selected file transfer method in order to transfer the image data of the photographing apparatus to the external device may also be displayed.

In operation S311, the overlapping file, i.e., the image data having the same file name as a file of the external device, is transferred based on the transfer method predetermined in operation S301 of setting an overlapping file transfer method. If the transfer of the image data is completed, a next image data of the photographing apparatus starts to transfer. Sub-operations of operation S311 may be the same as described with reference FIG. 5, and a detailed description thereof will not be repeated here.

According to the file transfer method of the photographing apparatus described above, the user may confirm the contents of the image data and the file of the external device that have the same file name conveniently, without having to execute an application program in the external device, such as a personal computer, for confirming the contents of the overlapping data, since the display unit of the photographing apparatus displays images of the image data and the file of the external device that have the same file name.

In addition, the overlapping file, i.e., the image data with the same file name as a file of the external device, may be automatically transferred based on the transfer method predetermined in operation S301 of setting an overlapping file transfer method.

As described above, in a photographing apparatus and a file transfer method in the photographing apparatus according to the present invention, when an external device, such as a personal computer, includes a file having the same file name as image data to be transferred from the photographing apparatus to the external device, it is convenient to check the contents of the image data and the file of the external device that have the same file name. In other words, since images of the image data and the file of the external device that have the same file name are displayed on the display unit of the photographing apparatus, files may be transferred conveniently without having to execute an application program in the external device, such as a personal computer, in order to confirm the contents of the image data of the photographing apparatus and the file of the external device.

In addition, when overlapping file names are found during transfer of files, various functions, such as overwriting, changing file names, or moving a file to another folder, may be selectively used, and thus the file transfer operation becomes efficient and convenient.

In general, an apparatus for performing the methods according to the embodiments of the present invention may be implemented using any general purpose computing device or devices. Any of the computing devices may comprise a processor, a memory for storing program data and executing the program data, a permanent storage such as a disk drive, a communications port for handling communications with external devices, and user interface devices, including a display, keyboard, mouse, etc. When software modules are involved, these software modules may be stored as program instructions executable on the processor on a computer-readable storage medium, where the program instructions stored on this medium can be read by the computing device, stored in the memory, and executed by the processor. Examples of the storage medium include magnetic storage media (e.g., floppy disks, hard disks, or magnetic tape), optical recording media (e.g., CD-ROMs or digital versatile disks (DVDs)), and electronic storage media (e.g., integrated circuits (IC's), ROM, RAM, EEPROM, or flash memory). The storage medium may also be distributed over network-coupled computing devices so that the program instructions are stored and executed in a distributed fashion.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like. The word mechanism is used broadly and is not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

It will be recognized that the terms "comprising," "including," and "having," as used herein, are specifically intended to be read as open-ended terms of art. The use of the terms "a" and "and" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context.

What is claimed is:

1. A photographing apparatus that captures an image and creates and stores image data of the image, the photographing apparatus comprising:
   a display unit that displays the image data;
   a communication interface that performs data communications with an external device by transmitting data to and receiving data from the external device; and
   a control unit that controls the communication interface to transfer the image data to the external device and, when the external device includes a file having the same file name as the image data, controls the display unit to display an image of the image data and an image of the file of the external device, wherein the control unit receives thumbnail information of the file of the external device that has the same file name as the image data, from the external device through the communication interface, and controls the display unit to display a thumbnail image of the file.

2. The photographing apparatus of claim 1, further comprising a user input unit that receives a user's input, wherein the control unit determines a method of transferring the image data to the external device based on an input signal from the user input unit.

3. The photographing apparatus of claim 1, wherein the control unit overwrites the file of the external device with the image data, changes the file name of the image data or the file of the external device, transfers the image data to another folder of the external device, or moves the file of the external device to another folder when the image data is transferred to the external device.

4. The photographing apparatus of claim 1, wherein the file included by the external device is an image file and the image of the file of the external device is at least a portion of the image stored in the image file of the external device.

5. The photographing apparatus of claim 1, wherein the control unit controls the display unit to display a thumbnail image of the image data.

6. A photographing apparatus that captures an image and creates and stores image data of the image, the photographing apparatus comprising:
a display unit that displays the image data;
a communication interface that performs data communications with an external device by transmitting data to and receiving data from the external device; and
a control unit that controls the communication interface to transfer the image data to the external device and, when the external device includes a file having the same file name as the image data, controls the display unit to display an image of the image data and an image of the file of the external device,
wherein the control unit confirms whether the external device includes a file having the same file name as the image data being transferred, by comparing the file name of the image data and the file name of the file of the external device, when a communication signal of the communication interface is received indicating that a delay has occurred in data transfer for a period of time.

7. The photographing apparatus of claim 6, wherein the control unit receives thumbnail information of the file of the external device that has the same file name as the image data, from the external device through the communication interface, and controls the display unit to display a thumbnail image of the file.

8. The photographing apparatus of claim 7, wherein the control unit controls the display unit to display a thumbnail image of the image data.

9. The photographing apparatus of claim 6, further comprising a user input unit that receives a user's input, wherein the control unit determines a method of transferring the image data to the external device based on an input signal from the user input unit.

10. The photographing apparatus of claim 6, wherein the control unit overwrites the file of the external device with the image data, changes the file name of the image data or the file of the external device, transfers the image data to another folder of the external device, or moves the file of the external device to another folder when the image data is transferred to the external device.

11. A file transfer method of transferring image data of a photographing apparatus that captures an image and creates and stores image data of the image to an external device, the method comprising:
transferring the image data of the photographing apparatus to the external device; and
when the external device includes a file having the same file name as the image data, displaying on a display unit of the photographing apparatus an image of the image data and an image of the file of the external device,
wherein the displaying comprises receiving thumbnail information of the file of the external device that has the same file name as the image data and displaying a thumbnail image of the file.

12. The file transfer method of claim 11, further comprising:
receiving a user's input; and
transferring the image data with the same file name as a file of the external device to the external device according to the received user's input.

13. The file transfer method of claim 12, wherein the transferring of the image data with the same file name as the file of the external device comprises executing one of the following operations according to the user's input: overwriting the file of the external device with the image data, changing the file name of the image data or the file of the external device, or moving the image data to another folder of the external device or moving the file of the external device to another folder.

14. The file transfer method of claim 11, further comprising setting an overlapping file transfer method before the transferring of the image data when the external device includes a file having the same file name as the image data, by selecting one of the following methods: overwriting the file of the external device with the image data, changing the file name of the image data or the file of the external device, or moving the image data to another folder of the external device or moving the file of the external device to another folder.

15. The file transfer method of claim 11, further comprising selecting image data to be transferred from the photographing apparatus to the external device.

16. The file transfer method of claim 11, wherein the file included by the external device is an image file and the image of the file of the external device is at least a portion of the image stored in the image file of the external device.

17. A file transfer method of transferring image data of a photographing apparatus that captures an image and creates and stores image data of the image to an external device, the method comprising:
transferring the image data of the photographing apparatus to the external device;
checking a communication status in the transferring of the image data;
searching the external device for a file having the same file name as the image data when a delay has occurred in the transferring of the image data; and
when the external device includes a file having the same file name as the image data, displaying on a display unit of the photographing apparatus an image of the image data and an image of the file of the external device.

18. The file transfer method of claim 17, wherein the displaying comprises receiving thumbnail information of the file of the external device that has the same file name as the image data and displaying a thumbnail image of the file.

19. The file transfer method of claim 18, wherein the displaying further comprises displaying a thumbnail image of the image data.

20. The file transfer method of claim 17, further comprising:
   receiving a user's input; and
   transferring the image data with the same file name as a file of the external device to the external device according to the received user's input.

21. The file transfer method of claim 20, wherein the transferring of the image data with the same file name as the file of the external device comprises executing one of the following operations according to the user's input: overwriting the file of the external device with the image data, changing the file name of the image data or the file of the external device, or moving the image data to another folder of the external device or moving the file of the external device to another folder.

22. The file transfer method of claim 17, further comprising setting an overlapping file transfer method before the transferring of the image data when the external device includes a file having the same file name as the image data, by selecting one of the following methods: overwriting the file of the external device with the image data, changing the file name of the image data or the file of the external device, or moving the image data to another folder of the external device or moving the file of the external device to another folder.

23. The file transfer method of claim 17, further comprising selecting image data to be transferred from the photographing apparatus to the external device.

* * * * *